UNITED STATES PATENT OFFICE.

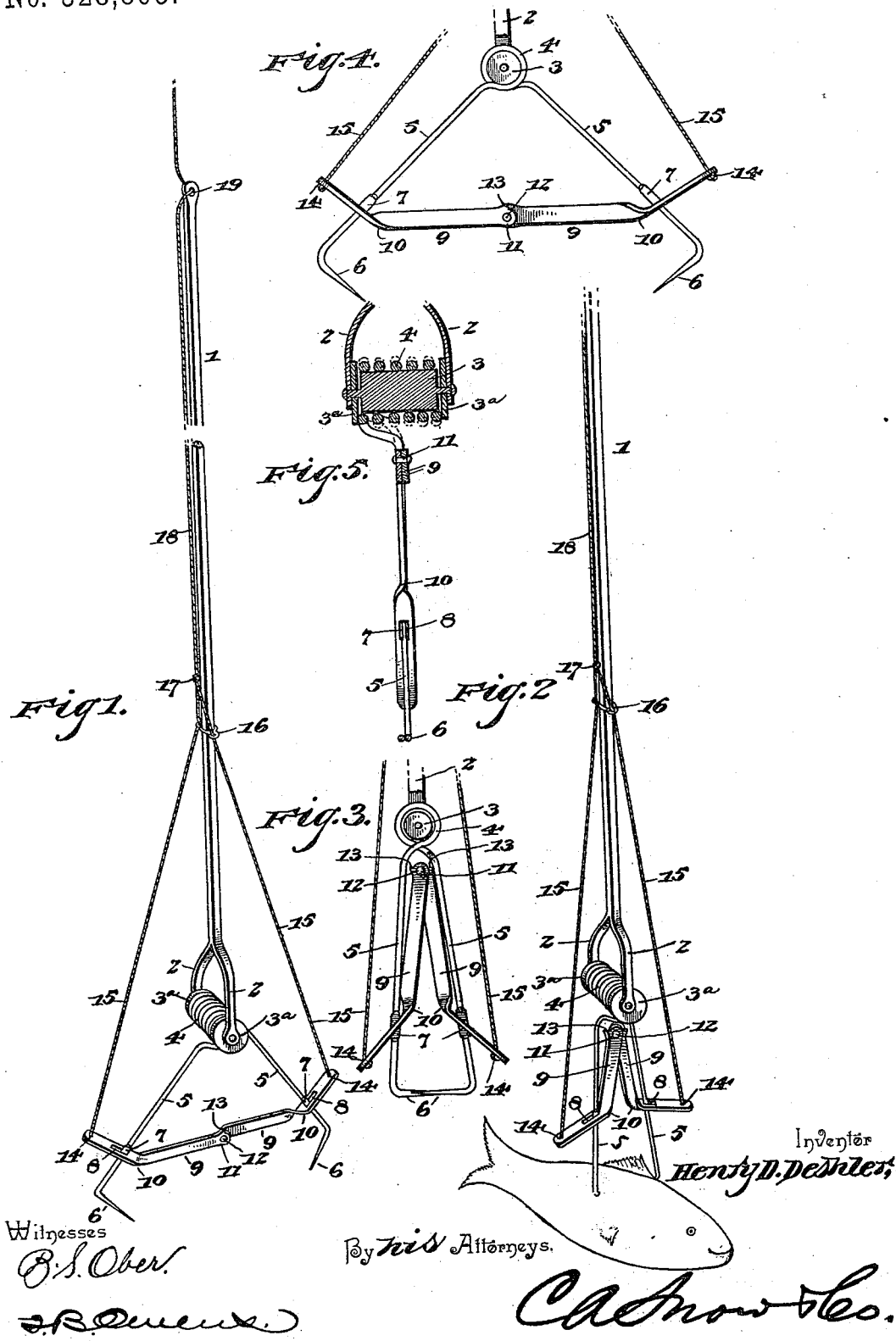

HENRY D. DESHLER, OF BELVIDERE, NEW JERSEY.

FISH-SPEAR.

SPECIFICATION forming part of Letters Patent No. 528,865, dated November 6, 1894.

Application filed June 28, 1894. Serial No. 515,993. (No model.)

*To all whom it may concern:*

Be it known that I, HENRY D. DESHLER, a citizen of the United States, residing at Belvidere, in the county of Warren and State of New Jersey, have invented a new and useful Fish-Spear, of which the following is a specification.

The object of this invention is to produce a fish spear which will secure its victim without having to force it into engagement with the same, or in other words, a spear which will automatically secure the fish upon slightly touching it; and it consists in certain novel features of construction and combination of parts whereby two spring-actuated spurs are provided and made capable of entering the sides of the fish on opposite sides of its body, upon being brought in contact therewith.

In the accompanying drawings: Figure 1 represents a perspective view, showing the spear extended and in operative position; Fig. 2, a similar view, showing it in engagement with a fish; Fig. 3, a side elevation of the spear, showing it closed, the view being enlarged and partially broken away; Fig. 4, an enlarged side elevation, showing the hook extended and also broken away at points; Fig. 5, a sectional view, taken at right angles to the longitudinal line of the hooks or spurs, and showing in dotted lines the different positions which the immediately-adjacent parts assume during the operation of the device, the view being taken on an enlarged scale.

The reference numeral 1 indicates the handle or shank of the spear, which may be formed of wood or metal, preferably the latter, and which is provided at its lower end with the bifurcations or arms 2, between which the roller 3 is revolubly secured. The roller 3 has its trunnions passing through the arms 2, and is provided at each of its ends with a flange 3ᵃ. Embracing the roller 2, and arranged between the flanges 3ᵃ thereof, is the coiled spring 4, which occupies the entire space therebetween and which has its ends bent inwardly to about the center of the roller and thence bent outwardly at right angles to the coiled portion of the spring to form the divergent rods 5, which are two in number and which have their free ends, or the extremities of the wire composing the spring 4, bent at right angles to the arms and pointed to form spurs 6. These spurs are of such a length that they will project with their points directly adjacent to each other; while the spring 4 has a normal tendency which will throw the rods 5 together and hold the spurs 6 in such position.

Formed on the rods 6, at points about one-third the length thereof and near their outer ends, are the reduced portions 7, which are one for each arm and which are provided for the reception of the openings 8 of the arms 9. The arms 9 are one for each of the rods 5, and have their outer ends formed with bends 10 therein, in which bends the openings 8 are located. The openings 8 are shaped as longitudinally-elongated slots, and this shape is given them so as to permit the rods 5 to play therein. The main portions of the arms 9 are formed with eyes 11, through which the pin 12 passes and by which the said inner ends are pivotally connected to each other.

13 indicates two laterally-offset shoulders, which are formed on the inner ends of the arms 9, and which are offset toward each other, so that when the arms are joined by the pin 12 the shoulders will engage each other and form a knuckle by which excessive movement on the pin 12 is prevented. This knuckle restricts the arms 9 only against outward movement and leaves them free to swing inwardly.

Formed in the outer ends or extremities of the arms 9 are the eyes 14, which are one for each arm, and which are provided for the reception of the respective cords 15. The cords 15 are secured within the eyes 14 by knotting the cords, or by any other suitable and approved means, and proceed from the eyes upwardly, through the double keeper 16 affixed to the shank or handle 1, after which they are joined to each other at the point 17. From the point 17 a single cord 18 extends, and this cord is passed up parallel with the handle or shank 1 and may have its upper end connected to the corresponding end of the shank or handle by means of the eye 19, or by any other preferred means.

In the use of my invention, the cord 18 is drawn upwardly until the arms 9 are moved out far enough to make the shoulders 13 thereof engage with each other, thus suppressing further outward movement of the rods. When the arms 9 are moved outwardly, as described, the rods 5 will be similarly moved, and this against the tension of the spring 4. At the extension of the rods 5 the spear is set and ready to operate in the catching of its victim. It will be observed that as the rods 5 are extended the coils of spring 4 will be contracted so as to tighten said coils around the roller 3 and cause the rods 5 to be secured thereto by the frictional contact between the two parts, thus preventing the arms from swinging loosely on the roller during the operation of bringing them into engagement with the fish or victim. On the other hand, as the arms are contracted, the coils of the spring will be enlarged so that there will be no very great degree of friction between the two parts. This attribute will make it possible for the fish, when caught, to dangle or swing with the rods 5 and upon the roller 3 without straining said rods or their spring 4. Supposing that the spear has been properly set and that it is desired to secure a fish thereby, the device is plunged downwardly so that the arms 9 will engage the fish at their joint. This will move the arms upwardly and allow the rods 5 to contract, throwing their spurs 6 into engagement with the sides of the fish and effectually securing it. When this has been effected the fish may be withdrawn from the water and landed, as is usual in the spearing of fish. It may be released by drawing upon the cord 18, which will spread the rods 5, thus releasing the fish and simultaneously resetting the spear.

It will be seen that my invention is simple and durable in construction, and that its simplicity renders it easy and inexpensive to manufacture, all of which attributes will make it highly desirable for fishermen, as will be understood without further description.

It is obvious that various changes in the size, proportion and arrangement of parts may be resorted to without departing from the spirit and scope of my invention; and therefore I do not propose to limit myself to the precise construction herein shown, but consider myself entitled to all such variations as come within the spirit and scope of my invention.

Having described the invention, I claim—

1. In a fish spear, the combination of a main rod or handle, a coiled spring mounted at one end thereof and having its ends projected away from the spring and bent to form spurs, the said ends having a tendency toward each other, two arms pivotally joined to each other at one of their ends and pivotally connected to the respective ends of the coiled spring, the pivotal connection between the ends of the arms being arranged between the ends of the spring, and operating cords connected to the outer ends of the arms, substantially as described.

2. In a fish spear, the combination of a main rod or handle having its lower end bifurcated, a drum fixed between the arms of said bifurcated end, a coiled spring embracing the drum and having its ends or terminals projected away from the drum to form rods, the said rods being bent at their ends to form spurs, two arms having their ends joined to each other by a knuckle joint and pivotally connected to the respective rods, the arms being arranged so that the joint thereof will be located between the rods, and operating cords connected to the outer ends of the arms, substantially as described.

3. In a fish spear, the combination of a rod or handle, a coiled spring mounted thereon and having its ends or terminals extended to form spurs, said spurs having a normal tendency toward each other, and means substantially as described for holding said spurs apart and for permitting them to move toward each other, substantially as described.

4. In a fish spear, the combination of a rod or handle, a coiled spring mounted thereon and having its ends extended to form spurs, said spurs having a normal tendency toward each other and each formed with a flattened portion bounded at each end with a shoulder, two arms connected to each other by a knuckle joint and each provided with an opening receiving the respective flattened portions of the spurs, and cords connected to the arms at their outer ends, substantially as described.

In testimony that I claim the foregoing as my own I have hereto affixed my signature in the presence of two witnesses.

HENRY D. DESHLER.

Witnesses:
JNO. B. BROOKFIELD,
EDWIN J. CARTER.